US008617493B2

(12) United States Patent
Keiser et al.

(10) Patent No.: US 8,617,493 B2
(45) Date of Patent: *Dec. 31, 2013

(54) CORROSION CONTROL IN AND SELENIUM REMOVAL FROM FLUE GAS WET SCRUBBER SYSTEMS

(75) Inventors: Bruce A. Keiser, Plainfield, IL (US); Jitendra T Shah, Naperville, IL (US); John V. Meier, Chicago, IL (US); Paul J. Zinn, Montgomery, IL (US); Jianwei Yuan, Aurora, IL (US); Raul Espinosa, Austin, TX (US); Rebecca L Stiles, Naperville, IL (US); Richard Mimna, Aurora, IL (US); Wayne M. Carlson, Batavia, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,461

(22) Filed: Feb. 6, 2012

(65) Prior Publication Data

US 2012/0177555 A1 Jul. 12, 2012

Related U.S. Application Data

(63) Continuation-in-part of application No. 11/952,637, filed on Dec. 7, 2007, now Pat. No. 8,110,163, and a continuation-in-part of application No. 12/754,683, filed on Apr. 6, 2010, now Pat. No. 8,211,389.

(51) Int. Cl.
*B01D 53/34* (2006.01)
*B01D 53/46* (2006.01)
*C23F 11/00* (2006.01)

(52) U.S. Cl.
USPC ............... 423/210; 422/7; 252/388; 252/394

(58) Field of Classification Search
USPC .................. 423/210; 422/7; 252/388, 394
See application file for complete search history.

(56) References Cited

U.S. PATENT DOCUMENTS

| 4,039,446 A | 8/1977 | Ban et al. |
| 4,451,351 A | 5/1984 | Porter |
| 4,670,180 A | 6/1987 | Moriya et al. |
| 4,731,187 A | 3/1988 | Moriya et al. |
| 5,500,133 A | 3/1996 | Carey et al. |
| 5,658,487 A | 8/1997 | Carey et al. |
| 5,854,173 A | 12/1998 | Chang et al. |
| 6,398,039 B1 | 6/2002 | Xue et al. |
| 6,521,021 B1 | 2/2003 | Pennline |
| 6,527,828 B2 | 3/2003 | Flippo et al. |
| 6,808,692 B2 | 10/2004 | Oehr |
| 6,818,043 B1 | 11/2004 | Chang et al. |
| 6,953,494 B2 | 10/2005 | Nelson, Jr. |
| 7,473,303 B1 | 1/2009 | Higgins et al. |
| 7,713,503 B2 | 5/2010 | Maly et al. |
| 7,776,780 B1 | 8/2010 | Granite et al. |
| 8,110,163 B2 * | 2/2012 | Keiser et al. ........... 423/210 |
| 8,142,548 B2 | 3/2012 | Higgins et al. |
| 8,211,389 B2 * | 7/2012 | Zinn et al. ............... 423/42 |
| 2003/0110948 A1 | 6/2003 | Gaita et al. |
| 2004/0045437 A1 | 3/2004 | Change et al. |
| 2005/0000901 A1 | 1/2005 | Campbell et al. |
| 2005/0147549 A1 | 7/2005 | Lissianski et al. |
| 2008/0202396 A1 | 8/2008 | Aradi et al. |

FOREIGN PATENT DOCUMENTS

| EP | 0506132 A1 | 9/1992 | |
| JP | 5791785 A | 6/1982 | |
| JP | 2000-063794 A * | 2/2000 | .......... C09K 3/00 |
| JP | 2000063794 A | 2/2000 | |

OTHER PUBLICATIONS

"Mercury Capture and Fate using Wet FGD at Coal-Fired Power Plants" by C.E. Miller, T.J. Freely, III; W.W. Aljoe, Bruce W. Lani, Karl T. Schroeder, Candace Kairies, Andrea T. McNemar, Andrew P. Jones, and James T. Murphy, DOE/NETL Mercury and Wet FGD R&D, (1-37) Aug. 2006.
"Pilot- and Full-Scale Demonstration of Advanced Mercury Control Technologies for Lignite-Fired Power :Plants", Final Report, Feb. 2005.
"Economics of Lime and Limestone for Control of Sulfer", William DePriest and Rajendra P. Gaikwad, (1-25), May 2003.
"Wet Flue Gas Desulfurization Technology Evaluation", Sargent & Lundy, LLC, Jan. 2003.
"Mercury Control Technologies for Coal-Based Power Plants," Edison Electric Institute, Aug. 2005.
"Bench-scale Kinetics Study of Mercury Reactions in FGD Liquors", Semiannual Technical Progress Report, Apr. 1, 2006-Sep. 30, 2006.
Desalination, 95, (1994) 325-345; The search for a chlorine-resistant reverse osmosis membrane; J. Glater, S-K Hong, M. Elimeleach. Journal of Applied Polymer Science, vol. 77, 1387-1392 (2000).
Preparation and Properties of Aromatic Polyamide Homologs Containing Chlorine Substituents; S. Kang, S. Jong C. Park; Dec. 1999 (1387-1392).
Macromol. Chem. Phys. 2001, 2002, No. 16, 3142-3148; Thermal and Mechanical Properties of Halogen-Containing Aromatic Polymaides; J. Alvarez, J. de la Campa, A. de Abajo.

* cited by examiner

*Primary Examiner* — Timothy Vanoy
(74) *Attorney, Agent, or Firm* — Edward O. Yonter; Andrew D. Sorensen (57) ABSTRACT

A method and composition for the reduction of the emission of selenium into the environment from the burning of fossil fuels with the use of two chemistries, either individually or in combination with each other. The method uses polydithiocarbamic compounds, including polydithiocarbamic compounds derived from a polymer produced from acrylic-x and alkylamine in conjunction with a scrubber process to capture selenium and reduce its emission in aqueous phase blowdown. The method and composition also helps reduce corrosion in the scrubber process.

20 Claims, 2 Drawing Sheets

FIG. 1

FIG. 2

CORROSION CONTROL IN AND SELENIUM REMOVAL FROM FLUE GAS WET SCRUBBER SYSTEMS

This application is a continuation-in-part of U.S. patent application Ser. No. 11/952,637, filed Dec. 7, 2007, which has issued as U.S. Pat. No. 8,110,163; and of U.S. patent application Ser. No. 12/754,683, filed Apr. 6, 2010, which has issued as U.S. Pat. No. 8,211,389, the disclosures of which are herein incorporated by reference.

COPYRIGHT NOTICE

A portion of the disclosure of this patent document contains or may contain copyright protected material. The copyright owner has no objection to the photocopy reproduction by anyone of the patent document or the patent disclosure in exactly the form it appears in the Patent and Trademark Office patent file or records, but otherwise reserves all copyright rights whatsoever.

TECHNICAL FIELD

This invention relates to the treatment of flue gas wet scrubber processes. More particularly, the invention relates to the method of capture of selenium from flue gases by flue gas wet scrubber processes. The invention also relates to minimizing corrosion in flue gas wet scrubber processes.

BACKGROUND

The demand for electricity continues to grow globally. In order to keep stride with the growing demand, coal is being looked to as a source for its generation. At present, burning coal produces some 50% of the electricity generated in the United States. The burning of coal in power generation plants results in the release of energy, as well as the production of solid waste such as bottom and fly ash, and flue gas emissions into the environment. Emissions Standards, as articulated in The Clean Air Act Amendments of 1990 as established by the U.S. Environmental Protection Agency (EPA), requires the assessment of hazardous air pollutants from utility power plants.

The primary gas emissions are criteria pollutants (e.g. sulfur dioxide, nitrogen dioxides, particulate material, and carbon monoxide). About two thirds of all sulfur dioxide and a quarter of the nitrogen dioxide in the atmosphere is attributable to electric power generation achieved by burning coal and other fuels.

Secondary emissions depend on the type of coal or fuel being combusted but include as examples mercury, selenium, arsenic, and boron. Selenium chemistry is similar to sulfur chemistry where selenium exists in flue gas as selenium dioxide and immediately converts to the selenite ion upon absorption into the liquid stream within the flue gas wet scrubber process. While certain chemistries have been known to successfully capture heavy metal cations, such chemistries would not expect to be effective at reducing selenium concentrations in liquid waste generated from flue gas wet scrubber processes.

Furthermore, because of the presence of high concentrations of halogens in the flue gas that is transferred to the scrubber liquor, flue gas wet scrubber processes can fail from corrosion. Recently, a metallurgy designated as 2205 alloy stainless steel has become popular in the industry due to its low cost and high chloride resistance. Typically, these scrubbers will operate with 10 to 12,000 ppm chloride concentration in their liquors. Unfortunately, flue gas wet scrubbers constructed of 2205 alloy have experienced increased levels of pitting and localized corrosion, resulting in forced, unscheduled unit shutdowns and expensive repairs.

One potential solution to the corrosion problem that has been implemented commercially is the use of potential adjustment protection ("PAP") systems. PAP systems apply an electrical potential across the metal surface in an effort to control and reduce corrosion. This method has been successful, but it requires the installation of electrodes into the scrubber and the constant application of electrical potential and current. It also suffers from being applicable to only wet surfaces within the scrubbers.

Another solution to the problem is the operation of flue gas wet scrubbers at less than 2000 ppm chloride concentrations. While this prolongs the time between failures, it does not completely halt corrosion. Additionally, this solution results in higher blowdown rates, translating into higher water usage, higher wastewater treatment costs, and overall higher operating costs.

Consequently, there remains a need for a technology that can cost-effectively remove selenium from flue gas in flue gas wet scrubber processes. Ideally, the technology would have the added benefit of minimizing corrosion in flue gas wet scrubber processes. The invention described below addresses these needs.

SUMMARY OF THE INVENTION

The invention is directed toward a method for removing selenium from flue gas in a flue gas wet scrubber process. The invention is also directed toward a method for minimizing corrosion in a flue gas wet scrubber process. Each method comprises the steps of burning fuel, thereby producing flue gas; and passing the flue gas into the flue gas wet scrubber process comprising a polydithiocarbamic compound of at least one polythiocarbamic material.

In another embodiment, the method comprises the steps of burning fuel, thereby producing flue gas; and passing the flue gas into the flue gas wet scrubber process comprising a polymer derived from at least two monomers: acrylic-x and an alkylamine, and wherein said acrylic-x has the following formula:

wherein X=OH and salts thereof or $NHR^2$ and wherein $R^1$ and $R^2$ is H or an alkyl or aryl group, wherein the molecular weight of said polymer is between 500 to 200,000, and wherein said polymer is modified to contain a functional group capable of scavenging at least one metal-comprising composition. The method may comprise a combination of the polydithiocarbamic compound and the polymer derived from acrylic-x and alkylamine. The polydithiocarbamic compound may be the polymer. The invention may further comprise a transition metal salt, which may be an iron salt.

In a third embodiment, the invention is directed toward a composition of matter comprising a polydithiocarbamic compound of at least one polythiocarbamic material; and a transition metal salt.

In a fourth embodiment, the invention is directed toward a composition of matter comprising a polymer derived from at least two monomers: acrylic-x and an alkylamine, and wherein said acrylic-x has the following formula:

wherein X=OH and salts thereof or $NHR^2$ and wherein $R^1$ and $R^2$ is H or an alkyl or aryl group, wherein the molecular weight of said polymer is between 500 to 200,000, and wherein said polymer is modified to contain a functional group capable of scavenging at least one metal-comprising composition; and an iron salt. The composition may be comprised additionally of a polydithiocarbamic compound of at least one polythiocarbamic material, and the polymer may be comprised of a polydithiocarbamic compound.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

While the present invention is susceptible of embodiment in various forms, there will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description of the Invention," relates to a requirement of the United States Patent Office, and does not imply, nor should be inferred to limit the subject matter disclosed herein.

The present invention documents the unexpected results obtained from the use of certain chemistries, which unexpectedly reduced selenium concentration nearly ten-fold in water phase blowdown of a flue gas wet scrubber process. While not wishing to be bound by a particular mechanism, through the addition of the chemistries within the flue gas wet scrubber process, the chemistries have the opportunity to capture the selenite before it has a chance to further oxidize to selenate. Selenate is difficult to remove from the water phase.

Additionally, the chemistries have also proved to be advantageous in minimizing corrosion in flue gas wet scrubber systems. Particularly, the chemistries have helped minimize corrosion in flue gas wet scrubber systems that are constructed of 2205 alloy. It was unexpectedly found that these chemistries, when circulated in a flue gas wet scrubber process with flue gas wet scrubber liquor, reduced the oxidation-reduction potential ("ORP") within the flue gas wet scrubber process. The reduction of ORP reduces the tendency for corrosion. Examples showing the reduction are provided below.

It is important to note that, while ORP is not exactly the same as corrosion potential, the two numbers track each other. ORP is an indication of the oxidative or reductive nature of the environment. Corrosion potential is the oxidative or reductive nature at the surface of a specific metal. Therefore, the corrosion potential generally reflects the ORP, but the two values are not the same. However, the ORP trend would typically indicate the corrosion potential trend. Hence, an observed reduction in ORP is expected to result in a reduction in corrosion potential. For the invention at hand, it was unexpected to see the addition of the chemistries, chelating agents for heavy metal removal, to result in a reduction in ORP value and thereby a reduction in corrosion rate.

In an embodiment, the flue gas wet scrubber process comprises a wet flue gas desulfurizer process.

In an embodiment, the flue gas wet scrubber process employs equipment comprising 2205 alloy.

In an embodiment, the fuel is selected from the group consisting of coal, reclaimed coal, natural gas, industrial waste, a gasified waste product, biomass, and any combination thereof.

Figure 1:
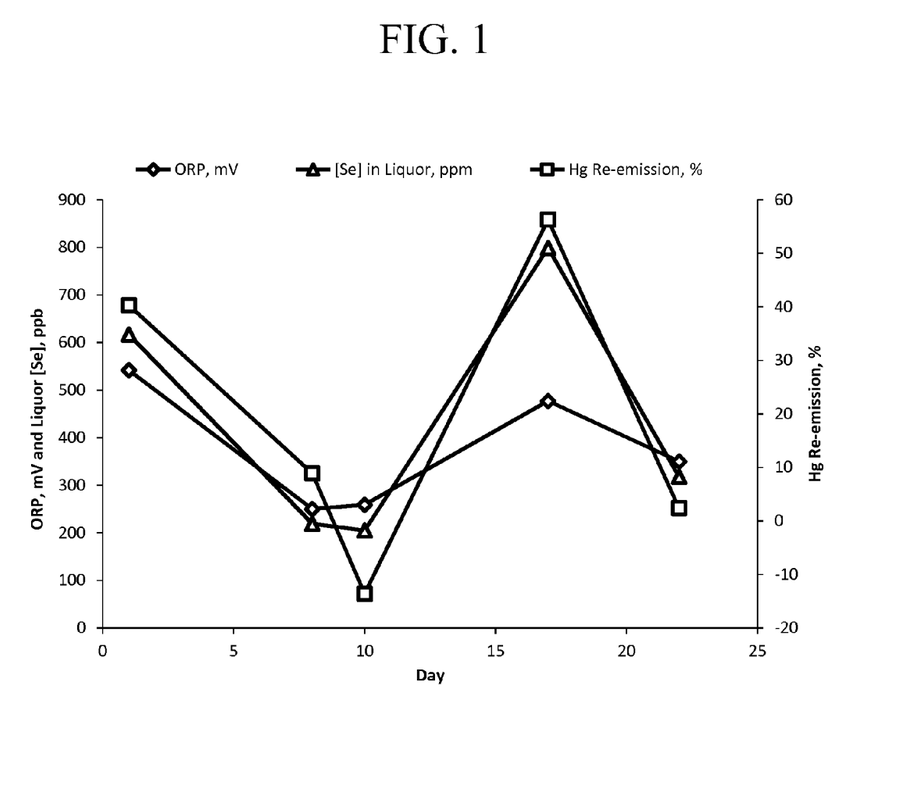
FIG. 1 is a graph demonstrating the positive effects of Chemistry 1 on decreased selenium concentration and decreased oxidation-reduction potential in the aqueous phase of a flue gas wet scrubber process.

Chemistry 1:

Chemistry 1 is a water-soluble ethylene dichloride ammonia polymer having a molecular weight of from 500 to 10,000, which contains from 5 to 55 mole % of dithiocarbamate salt groups. Chemistry 1 may additionally comprise a transition metal salt, which may be an iron salt. The positive effects of Chemistry 1 on both reduction of selenium in the aqueous phase and reduction in oxidation-reduction potential are shown in FIG. 1. The ethylene dichloride-ammonia polymers are prepared by the reaction of ethylene dichloride and ammonia. The starting ethylene dichloride—ammonia polymers generally have a molecular weight range of 500-100,000. In a preferred embodiment the molecular weight is 1,500 to 10,000, with the most preferred molecular weight range being 1,500 to 5,000. The copolymer of this invention is produced using methods presented in U.S. Pat. No. 4,731,187; 5,500,133; or 5,658,487 that are examples of said copolymers available for use in the claimed invention. The copolymer is produced by the reaction of the polyamines or polyimines with carbon disulfide to produce polydithiocarbamic acid or its salts. Such reaction is preferably carried out in a solvent such as water or alcohol at a temperature of from 30° and 100° C. for periods of time ranging between 1 and 10 hours. Good conversion is obtained at temperatures between 40° and 70° C. for 2 to 5 hours. These reaction conditions apply to the modification of ethylene dichloride-ammonia polymers described previously.

The mole % of dithiocarbamate salt groups in the finished polymer generally is within the range of 5 to 55%. The preferred range is 20 to 55 mole %, with the most preferred range being about 30 to 55 mole %.

The salts include but are not limited to alkaline and alkali earth such as sodium, lithium, potassium or calcium. The chemistry may include at least one transition metal salt, which may be an iron salt.

The scrubber processes currently used in the industry include spray towers, jet bubblers, and co-current packed towers as examples. These types of air quality control devices ("AQCDs") are provided as examples and are not meant to represent or suggest any limitation. The water-soluble copolymer may be added to virgin limestone or lime slurry prior to addition to the scrubber, the recirculation loop of the scrubber liquor, or the "low solids" return to the scrubber from the scrubber purge stream.

Typically, the copolymer is applied at a ratio of 1:1 to 2000:1 weight copolymer to weight of selenium being captured. The preferred ratio is from 5:1 to 1000:1 and the most preferred range is from 5:1 to 500:1.

In general the polydithiocarbamic acid compounds may be introduced into the scrubber and thereby into the scrubber liquor via several routes. The following will serve as just some of the variations that are available to introduce the compounds into the scrubber liquor. The scrubber liquor is defined as the water-based dispersion of calcium carbonate (limestone) or calcium oxide (lime) used in a wet flue gas scrubber ("FGS," also known as a wet flue gas desulfurizer, or "FGD") to capture $SO_x$ emissions. The liquor may also contain other additives such as magnesium and low-molecular weight organic acids, which function to improve the sulfur, capture. One example of such an additive is a mixture of low-molecular weight organic acids known as dibasic acid ("DBA"). DBA consists of a blend of adipic, succinic, and glutaric acids. Each of these organic acids can also be used individually. In addition, another low-molecular weight organic acid that can be used to improve sulfur capture in a wet scrubber is formic acid. Finally, the scrubber liquor will also contain byproducts of the interaction between the lime or limestone and sulfur species, which leads to the presence of various amounts of calcium sulfite or calcium sulfate. The scrubber liquor includes but is not limited to the make-up liquor, return liquor, the reclaimed liquor, virgin liquor and liquor injected directly into flue gases.

Another addition point for the polydithiocarbamic compounds of this invention to the wet scrubber is via the "low solids" liquor return. A portion of the liquor is usually continuously removed from the scrubber for the purpose of separating reaction byproducts from unused lime or limestone. One means of separation that is currently used is centrifugation. In this process the scrubber liquor is separated into a "high solids" and "low solids" stream. The high solids stream is diverted to wastewater processing. The low solids fraction returns to the wet scrubber and can be considered "reclaimed" dilute liquor. The polydithiocarbamic acid compounds of this invention can conveniently be added to the reclaimed low solids stream prior to returning to the scrubber.

Another feed liquor found in the operation of a wet flue gas desulfurizer is called "virgin liquor." Virgin liquor is the water-based dispersion of either lime or limestone prior to exposure to flue gas and is used to added fresh lime or limestone while maintaining the scrubber liquor level and efficiency of the wet FGD. This is prepared by dispersing the lime or limestone in water. Here the polydithiocarbamic acid compounds can be added either to the dispersion water or the virgin liquor directly.

Finally, some wet scrubber installations use scrubber liquor and/or water (fresh or recycled) injected directly into the flue gas prior to the scrubber for the purpose of controlling relative humidity of the flue gas or its temperature. The excess liquid is then carried into the wet scrubber. Here also are two potential addition points for the introduction of the polydithiocarbamic acid compounds of the present invention.

The addition of the polydithiocarbamic acid compounds can be made in any of these locations, wholly or fractionally (i.e. a single feed point or multiple feed points), including but not limited to the make-up water for the lime or limestone slurry or the scrubber liquor.

Chemistry 2:

A. Composition

The present disclosure provides for a composition comprising a polymer derived from at least two monomers: acrylic-x and an alkylamine, wherein said acrylic-x has the following formula:

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals.

The metals can include zero valent, monovalent, and multivalent metals. The metals may or may not be ligated by organic or inorganic compounds. Also, the metals can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt and gold. The molecular weight of the polymers can vary. For example, the target species/application for the polymers can be one consideration. Another factor can be monomer selection. Molecular weight can be calculated by various means known to those of ordinary skill in the art. For example, size exclusion chromatography, as discussed in the examples below can be utilized.

When molecular weight is mentioned, it is referring to the molecular weight for the unmodified polymer, otherwise referred to as the polymer backbone. The functional groups that are added to the backbone are not part of the calculation. Thus the molecular weight of the polymer with the functional groups can far exceed the molecular weight range.

In one embodiment, the molecular weight of the polymer is from 1,000 to 16,000.

In another embodiment, the molecular weight of said polymer is from 1,500 to 8,000. Various functional groups can be utilized for metal scavenging. The following phraseology would be well understood by one of ordinary skill in the art: wherein said polymer is modified to contain a functional group capable of scavenging one or more compositions containing one or more metals. More specifically, the polymer is modified to contain a functional group that can bind metals.

In one embodiment, the functional group contains a sulfide containing chemistry.

In another embodiment, the functional group is a dithiocarbamate salt group.

In another embodiment, the functional groups are at least one of the following: alkylene phosphate groups, alkylene carboxylic acids and salts thereof, oxime groups, amidooxime groups, dithiocarbamic acids and salts thereof, hydroxamic acids, and nitrogen oxides.

The molar amounts of the functional group relative to the total amines contained in the unmodified polymer can vary as well. For example, the reaction of 3.0 molar equivalents of carbon disulfide to a 1.0:1.0 mole ratio acrylic acid/TEPA copolymer, which contains 4 molar equivalents of amines per repeat unit after polymerization, will result in a polymer that is modified to contain 75 mole % dithiocarbamate salt group. In other words, 75% of the total amines in the unmodified polymer has been converted to dithiocarbamate salt groups.

In one embodiment, the polymer has between 5 to 100 mole % of the dithiocarbamate salt group. In a further embodiment, the polymer has from 25 to 90 mole % of the dithiocarbamate salt group. In yet a further embodiment, the polymer has from 55 to 80 mole % of the dithiocarbamate salt group.

Monomer selection will depend on the desired polymer that one of ordinary skill in the art would want to make.

The alkylamines may vary in kind.

In one embodiment, the alkylamine is at least one of the following: an ethyleneamine, a polyethylenepolyamine, ethylenediamine (EDA), diethylenetriamine (DETA), triethylenetetraamine (TETA) and tetra ethylenepetamine (TEPA) and pentaethylenehexamine (PEHA).

The acrylic-x monomer group can vary as well.

In another embodiment, the acrylic-x is at least one of the following: methyl acrylate, methyl methacrylate, ethyl acrylate, and ethyl methacrylate, propyl acrylate, and propyl methacrylate.

In another embodiment, the acrylic-x is at least one of the following: acrylic acid and salts thereof, methacrylic acid and salts thereof, acrylamide, and methacrylamide.

The molar ratio between monomers that make up the polymer, especially acrylic-x and alkylamine can vary and depend upon the resultant polymer product that is desired. The molar ratio used is defined as the moles of acrylic-x divided by the moles of alkylamine.

In one embodiment, the molar ratio between acrylic-x and alkylamine is from 0.85 to 1.5.

In another embodiment, the molar ratio between acrylic-x and alkylamine is from 1.0 to 1.2.

Various combinations of acrylic-x and alkylamines are encompassed by this invention as well as associated molecular weight of the polymers.

In one embodiment, the acrylic-x is an acrylic ester and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic ester can be at least one of the following: methyl acrylate, methyl methacrylate, ethyl acrylate, and ethyl methacrylate, propyl acrylate, and propyl methacrylate, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, 55 to 80 mole %.

In another embodiment, the acrylic-x is an acrylic amide and the alkylamine is TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic amide can be at least one or a combination of acrylamide and methacrylamide, which is combined with at least one of the alklyamines, which includes PEHA or TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

In another embodiment, the acrylic-x is an acrylic acid and salts thereof and the alkylamine is PEHA or TEPA or DETA or TETA or EDA. In a further embodiment, the molar ratio between acrylic-x and alkylamine is from 0.85 to 1.5. In yet a further embodiment, the molecular weight can encompass ranges: 500 to 200,000, 1,000 to 16,000, or 1,500 to 8,000. In yet a further embodiment, the acrylic acid can be at least one or a combination of acrylic acid or salts thereof and methacrylic acid or salts thereof, which is combined with at least one of the alklyamines, which includes TEPA or DETA or TETA or EDA. In yet a further embodiment, the resulting polymer is modified to contain the following ranges of dithiocarbamate salt groups: 5 to 100 mole %, 25 to 90 mole %, or 55 to 80 mole %.

Additional monomers can be integrated into the polymer backbone made up of constituent monomers acrylic-x and alkylamine. A condensation polymer reaction scheme can be utilized to make the basic polymer backbone chain. Various other synthesis methods can be utilized to functionalize the polymer with, for example, dithiocarbamate and/or other non-metal scavenging functional groups. One of ordinary skill in the art can functionalize the polymer without undue experimentation.

Moreover, the composition of the present invention can be formulated with other polymers such as those disclosed in U.S. Pat. No. 5,164,095, herein incorporated by reference, specifically, a water soluble ethylene dichloride ammonia polymer having a molecular weight of from 500 to 100,000 which contains from 5 to 50 mole % of dithiocarbamate salt groups. In one embodiment, the molecular weight of the polymer is from 1500 to 10,000 and contains 15 to 50 mole % of dithiocarbamate salt groups. In a preferred embodiment, the molecular weight of the polymer is from 1500 to 5000 and contains 30 to 55 mole % of dithiocarbamate salt groups. Also, the composition of the present invention can be formulated with other small molecule sulfide precipitants such as sodium sulfide, sodium hydrosulfide, TMT-15® (sodium or calcium salts of trimercapto-S-triazine; Evonik Industries Corporation 17211 Camberwell Green Lane, Houston, Tex. 77070, USA), dimethyldithiocarbamate and diethyldithiocarbamate.

B. Dosage

The dosage of the disclosed polymers for use may vary. The calculation of dosage amounts can be done without undue experimentation.

Process medium quality and extent of process medium treatment are a couple of factors that can be considered by one of ordinary skill in the art in selecting dosage amount. A jar test analysis is a typical example of what is utilized as a basis for determining the amount of dosage required to achieve effective metals removal in the context of a process water medium, e.g. wastewater.

In one embodiment, the amount of modified polymer of the invention capable of effectively removing metals from contaminated waters is preferably within the range of 0.2 to 2 moles of dithiocarbamate per mole of metal. More preferably, the dosage is 1 to 2 moles of dithiocarbamate per mole of metal contained in the water. According to one embodiment of the invention, the dosage of metal removal polymer required to chelate and precipitate 100 ml of 18 ppm soluble copper to about 1 ppm or less was 0.011 gm (11.0 mg) of polymer. The metal polymer complexes formed are self-flocculating and quickly settle. These flocculants are easily separated from the treated water.

In the context of applying the polymer to a gas system, such as a flue gas, the polymer can be dosed incrementally and capture rates for a particular metal, e.g. such as mercury, can be calculated by known techniques in the art.

C. Methods of Use

The present disclosure also provides for a method of removing selenium from a medium containing selenium which comprises the steps of: (a) treating said medium containing metals with a composition comprising a polymer derived from at least two monomers: acrylic-x and an alkylamine, wherein said acrylic-x has the following formula:

wherein X=OR, OH and salts thereof, or $NHR^2$ and wherein $R^1$ and $R^2$ is H or an alkyl or aryl group, wherein R is an alkyl or aryl group, wherein the molecular weight of said polymer is between 500 to 200,000, and wherein said polymer is modified to contain a functional group capable of scavenging one or more compositions containing one or more metals; and (b) collecting said treated metals.

The compositions as described above are incorporated into this section and can be applied within the claimed methodologies encompassed by this invention.

Mediums containing selenium can vary and include at least one of the following wastewater streams, liquid hydrocarbonaceous streams, flue gas streams, flyash, and other particulate matter. Various processing steps can be coupled with metals removal, including, but not limited to filtration steps and/or air quality control devices, e.g. baghouses and electrostatic precipitators and other air quality control devices.

Mediums containing a liquid phase medium/a medium containing a liquid phase are one target for the claimed invention.

In one embodiment, the medium is a process stream containing water, e.g. wastewater or wastewater from a power plant or industrial setting (power plant, mining operation, waste incineration, and/or manufacturing operation).

In another embodiment, the medium is a liquid hydrocarbonaceous stream common in petroleum refining processes or petrochemical processes. Examples include streams from these processes that contain petroleum hydrocarbons such as petroleum hydrocarbon feedstocks including crude oils and fractions thereof such as naphtha, gasoline, kerosene, diesel, jet fuel, fuel oil, gas oil vacuum residual, etc or olefinic or napthenic process streams, ethylene glycol, aromatic hydrocarbons, and their derivatives.

In another embodiment, additional chemistries, flocculants and/or coagulants can be utilized in conjunction with the chemistry encompassed by this invention. The chemistries applied to a medium containing metals can vary, including, the addition of at least one of the following: cationic polymers, anionic polymers, amphoteric polymers, and zwitterionic polymers.

In another embodiment, the method of this invention further comprises an additional treatment to the process stream with a complexing amount of a water soluble ethylene dichloride ammonia polymer having a molecular weight of from 500 to 100,000 which contains 5 to 50 mole % of dithiocarbamate salt groups to form a complex of these metals, e.g. heavy metals. In a further embodiment, the molecular weight of the polymer is from 1500 to 10,000 and contains 15 to 50 mole % of dithiocarbamate salt groups. In a preferred embodiment, the molecular weight of the polymer is from 1500 to 5000 and contains 30 to 55 mole % of dithiocarbamate salt groups.

In another embodiment, the polymer treatment and additional treatment are added in a ratio of 1:1.

Mediums containing a gas phase medium/a medium containing a gas phase are another target for the claimed invention. In addition, processes containing a liquid and/or gas phase medium are encompassed by this invention as well.

In another embodiment, the medium is part of a heat generating system, e.g. a flue gas stream.

In another embodiment, the heat generating system is at least one of the following: a combustion system; a power plant combustion system; a coal combustion system; a waste incineration system; a kiln; a kiln for mining or cement operations; and an ore processing system. In another embodiment, the method of this invention further comprises applying an oxidizing agent to a heat generating system. In a further embodiment, the oxidizing agent is applied prior to said polymer treatment.

In a yet a further embodiment, a multiphase treatment protocol for a process involves treating a gas and a liquid, e.g., one or more metals in a gas such as mercury and one or more metal in a liquid. This can involve the polymer treatment and additional treatment as described above.

In yet a further embodiment, the oxidizing agent is at least one of the following: a thermolabile molecular halogen, calcium bromide, or a halogen containing compound. In yet a further embodiment, this invention further comprises applying an oxidizing agent to the flue gas; optionally wherein said oxidizing agent oxidizes a target species at a temperature of 500° C. or greater or a temperature where the oxidant is capable of oxidizing molecular mercury that exists in a process that generates mercury; optionally wherein said target species is elemental mercury or derivatives thereof; and optionally wherein said oxidizing agent is at least one of the following: a thermolabile molecular halogen, calcium bromide, or a halogen containing compound. Mercury oxidant methodologies are described in U.S. Pat. Nos. 6,808,692 and 6,878,358, which are herein incorporated by reference.

In another embodiment, the polymer treatment occurs at a temperature 300° C. or below, preferably 250° C. or below.

The invention is illustrated by the proceeding descriptions and the following examples which are not meant to limit the invention unless otherwise stated in the claims appended hereto.

EXAMPLES

The foregoing may be better understood by reference to the following examples, which are intended to illustrate methods for carrying out the invention and are not intended to limit the scope of the invention.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Chemistry 1

Examples 1-6

Example 1

A sample of scrubber water that was treated by vacuum filter. The objective was to remove mercury. The sample was investigated for mercury removal using design of experiments with two variables pH and dosage.

The results showed that mercury levels of less than 0.5 ppb in the treated water was achieved at various pHs at a reasonable product dosages. This work demonstrated that the product did achieve mercury capture from wet FGD liquors. The lower detection limit of the analytical method was 0.5 ppb. The results are as follows:

| Number | Sample Name | DTCP[a] (ppm) | Flocculant[b] (ppm) | Total Hg content (ppb) | Dissolved Hg content (ppb) |
|---|---|---|---|---|---|
| 60 | blank as recd (pH = 6) | 0 | 0 | 22.3 | 17.2 |
| 61 | | 10 | 2 | <0.5 | <0.5 |
| 62 | | 20 | 2 | <0.5 | <0.5 |
| 63 | | 30 | 2 | <0.5 | <0.5 |
| 65 | | 50 | 2 | <0.5 | <0.5 |
| 67 | | 70 | 2 | <0.5 | <0.5 |
| 610 | | 100 | 2 | <0.5 | <0.5 |
| 70 | pH 7.1 adj w lime | 0 | 0 | 11.3 | 6.2 |
| 71 | | 10 | 2 | 1.6 | 0.5 |
| 72 | | 20 | 2 | 1.3 | <0.5 |
| 73 | | 30 | 2 | <0.5 | <0.5 |
| 75 | | 50 | 2 | <0.5 | <0.5 |
| 710 | | 100 | 2 | <0.5 | <0.5 |
| 80 | pH 8 adj w lime | 0 | 0 | 6.0 | 5.1 |
| 81 | | 10 | 2 | 1.2 | 0.5 |
| 82 | | 20 | 2 | <0.5 | <0.5 |
| 83 | | 30 | 2 | <0.5 | <0.5 |
| 84 | | 40 | 2 | <0.5 | <0.5 |
| 85 | | 50 | 2 | <0.5 | <0.5 |
| 810 | | 100 | 2 | <0.5 | <0.5 |

[a]DTCP is a polydithiocarbamic compound of the present invention
[b]Flocculant is commercially available from Nalco Company and is a very high molecular, 30 mole % anionic latex polymer.

Example 2

A 2 L solution was prepared by dissolving 6.7 mg of sodium selenite, $Na_2SeO_3 \cdot 5H_2O$, 14 mL of 0.141M $Hg(NO_3)_2$ and 18.4 g of calcium chloride, $CaCl_2 \cdot 2H_2O$. The resulting solution had measured concentrations of 0.037 mM selenium, 1.04 µM mercury and 63 mM calcium chloride dehydrate.

The results are shown in the table below.

| Treatment | Amt (gm/500 mL) | Hg (µg/L) | % Removed |
|---|---|---|---|
| Fly Ash | 8.04 | 202 | 3.35 |
| Zeolite | 7.99 | 213 | 0.00 |

The zeolite was a spent commercial catalyst. The fly ash sample was obtained from a coal-fired power plant. The fly ash sample was composed of 93% ash content with 6% residual carbon and 1% residual sulfur. These results clearly show that neither fly ash nor zeolites significantly reduce the ionic mercury content.

Example 3

A synthetic FGD scrubber liquor was prepared by dissolving 12.58 g of calcium chloride dihydrate, $CaCl_2 \cdot 2H_2O$, in 400 mL of deionized water. The resulting solution was 214 mM in calcium chloride dihydrate leading to 15,000 ppm chloride and 8560 ppm calcium in solution. The solution was split into two equal portions. To 200 mL of solution was added 164 µL of 0.61 mM mercury nitrate solution to yield a solution containing 130 µg/L of ionic mercury. This solution was treated with 27.4 g of calcium sulfate dihydrate or 18 weight percent. The solution was mixed and split into two portions. The smaller portion, 75 g total, was treated with the polydithiocarbamic acid compound at a 5:1 product to mercury weight ratio. The polydithiocarbamic acid compound product was a 30% active water miscible solution. The two portions were agitated separately with a magnetic stir bar for 12 hours. After which time, the suspension was filtered using a Pall Life Sciences GN-6 Metricel 0.45µ, membrane filter (P/N 63069). The filtrate was analyzed for mercury.

A second portion, 200 g, of calcium chloride dihydrate solution was treated with 82 µL of 0.61 mM mercuric nitrate solution to yield a solution containing 78.3 µg of ionic mercury. Again this solution was treated with 27.4 g of calcium sulfate, dihydrate to yield a slurry containing 18% by weight. As before, this sample was split into two solutions, the minor portion, 75 g, was treated with the polydithiocarbamic acid compound product at a 5:1 product weight to mercury weight ratio. After further mixing for 12 hours using a magnetic stir bar, the dispersions were filtered using a Pall Life Sciences GN-6 Metricel 0.45µ membrane filter (P/N 63069). The filtrate was analyzed for mercury.

The results are shown below.

| Description | Mercury (µg/L) | % Removal |
|---|---|---|
| High Mercury content, blank | 130 | |
| High Mercury with gypsum | 130 | 0.00% |
| High Mercury with gypsum and copolymer of invention | <0.10 | >99.9% |
| Low Mercury, blank | 78.3 | |
| Low Mercury with gypsum | 74.7 | |
| Low Mercury with gypsum and copolymer of invention | <0.10 | >99.9% |

It is clear from this example that the polydithiocarbamic acid compound of this invention removes the ionic mercury from the liquid phase. The gypsum solids for the above samples were submitted for TGA (Thermogravimetric Analysis) in order to observe any decomposition or release of mercury. All the thermographs were identical exhibiting only the loss of associated and bound water between room temperature and 170° C. Above this temperature no further decomposition could be observed. This indicates that once the complex is formed, it does not decompose under normal FGD scrubber operation.

Example 4

A general stock solution was prepared containing 0.214M calcium chloride dihydrate by dissolving 220 g of $CaCl_2 \cdot 2H_2O$ in 7 L of deionized water. To this was added 74 µL of 61 mM mercury nitrate solution to yield a solution containing 136 µg/L. This solution was divided into two portions. The first portion was mixed with enough calcium sulfate dihydrate to yield slurry at 18% by weight-dispersed solids. The second portion was mixed with enough calcium sulfate dihydrate to yield a 21% by weight slurry.

Organic acids are used in many wet FGD scrubbers to improve the $SO_x$ removal efficiency as well as the limestone or lime utilization. In most cases, a by-product stream known in the industry as Dibasic Acid or DBA is the product of choice. DBA is a mixture of adipic acid (aka hexanedioic acid), succinic acid (aka butanedioic acid) and glutaric acid (aka pentaedioic acid). For the purposes of this example, a "synthetic" DBA was prepared using an equal molar ratio of adipic and succinic acids. The adipic acid can be obtained from Mallinckrodt Chemicals, Cat No. MK180159. The succinic acid can be obtained from J. T. Baker, reagent grade, Cat. No. JT0346-5. The solutions were spiked with the equal molar ratio acids to produce 332 and 100 ppm total acid concentrations.

The polydithiocarbamic acid compound of the current invention was added at a product to mercury weight ratio of 4.5:1 and 1:1 respectively with or without the synthetic DBA present in the slurry. The order of addition was kept to the following: synthetic DBA then the polydithiocarbamic acid compound of this invention. Once the various additives have been introduced into the slurry, it is mixed for an additional 15 to 20 minutes with a magnetic stir bar. After this time, the slurry is filtered using a Pall Life Sciences GN-6 Metricel 0.45µ, membrane filter (P/N 63069). The filtrate is subsequently analyzed.

The results are shown in the table below:

| Description | DBA Type | Dose(ppm) | Additive Type | ratio | Hg µg/L |
|---|---|---|---|---|---|
| water | | | | | 136 |
| 18% Gypsum | | | | | 121 |
| 18% Gypsum | | | DTCP | 0.91 | <0.5 |
| 18% Gypsum | | | DTCP | 4.5 | <0.5 |
| 18% Gypsum | Syn DBA | 332 | | | 75.7 |
| 18% Gypsum | Syn DBA | 332 | DTCP | 0.91 | <0.5 |
| 18% Gypsum | Syn DBA | 332 | DTCP | 0.91 | <0.5 |
| 18% Gypsum | Syn DBA | 332 | DTCP | 4.5 | <0.5 |
| 18% Gypsum | Syn DBA | 100 | | | 81.2 |
| 18% Gypsum | Syn DBA | 100 | DTCP | 0.91 | <0.5 |
| 18% Gypsum | Syn DBA | 100 | DTCP | 4.5 | <0.5 |
| 20.7% Gypsum | | | | | 83.5 |
| 20.7% Gypsum | | | DTCP | 0.91 | <0.5 |
| 20.7% Gypsum | | | DTCP | 4.5 | <0.5 |
| 20.7% Gypsum | Syn DBA | 332 | | | 80.3 |
| 20.7% Gypsum | Syn DBA | 332 | DTCP | 0.91 | <0.5 |
| 20.7% Gypsum | Syn DBA | 332 | DTCP | 0.91 | <0.5 |
| 20.7% Gypsum | Syn DBA | 332 | DTCP | 4.5 | 0.9 |

DTCP is the polydithiocarbamic acid compound of this invention. See above for the definition of synthetic DBA, aka "Syn DBA".

The results in the table above clearly show that the presence of organic acids in the scrubber liquor does not interfere with the performance of the polydithiocarbamic acid compound of this invention regarding complexing mercury in the liquid phase. The results also confirm that the copolymer interacts with and removes ionic mercury from the liquid phase to below 500 parts per trillion.

Example 5

Three additives were tested in a bench-scale wet scrubber with a gas flow of 1-cfm. One additive, TMT-15 is currently used to control mercury emissions from incinerators. The polydithiocarbamic acid compound, sodium salt used is an embodiment of the claimed invention.

The bench-scale unit allows for the use of a simulated flue gas composed of $SO_2$, $NO_x$, HCl, $CO_2$, oxygen and nitrogen. Moisture is controlled by exposing a portion of the oxygen, carbon dioxide, and nitrogen to water saturators. The flue gas composition used in the study consisted of 15-25 µg/Nm³ $HgCl_2$, 12% $CO_2$, 3% $O_2$, 1000 ppm $SO_2$, 15 ppm HCl, no $NO_x$, the balance nitrogen. The flow rate was 28 L/min. The sorbent solution or scrubber liquor was maintained at a temperature of 55° C. and consisted of 100 mM sodium chloride, and 10 mM sodium sulfate (initial concentration) with a pH of 5.0. The sulfite concentration was controlled at 5 mM by the addition of hydrogen peroxide to the sorbent solution. The pH of the scrubber liquor was maintained by the addition of NaOH. In each case, the appropriate amount of additive was introduced into the scrubber liquor just prior to the injection of 0.5 µM $HgCl_2$ as a solution of 0.5 mM $HgCl_2$ and after the system had reached equilibrium.

The bench-scale scrubber uses a bubbler type gas contactor. The gas contact vessel sits on top of the scrubber liquor reaction vessel so that the liquor returns to the reactor vessel via gravity drainage. The liquor is recirculated into the scrubber via a recirculation pump to maintain a constant liquid/gas ratio. The pH is monitored both in the scrubber and in the reaction vessel. The pH of the reaction vessel is maintained by addition of sodium hydroxide solution. The reaction vessel is mixed via magnetic stirring. A flow-through cell and spectrophotometer was used to monitor sulfite concentration in the scrubber liquor via a modification of a method reported by M. W. Scoggins, Analytical Chemistry, 42(9), 1091 (1970). The results were used to automatically control the addition of hydrogen peroxide so as to maintain the target sulfite concentration. Oxidized mercury is added to the gas by passing a portion of the dry nitrogen gas through a mercury diffusion cell. About 5% of the total mercury introduced in this way was elemental. Two separate CVAAS (Cold Vapor Atomic Adsorption Spectroscopy) instruments monitored respectfully the flue gas inlet and the scrubber outlet. The mercury re-emissions were calculated as follows:

Average re-emission=[average elemental Hg outlet]−[average elemental Hg inlet]

The results are shown in the table below:

| Additive | Hg re-emissions, µg/Nm³ |
|---|---|
| None | 2.05 |
| 0.05 mM TMT-15 | 1.70 |
| 0.022 mM DEDTC[b] with 15 mM $Ca^{+2}$ | 1.05 |
| 0.05 mM Polydithiocarbamic acid, sodium salt | <0.01 |

[b]diethyldithiocarbamate, sodium salt

It is clear from these bench-scale results that the polydithiocarbamic acid compound of the current invention successfully controls the re-emission of mercury from a wet FGD and does so more efficiently than the current art.

Example 6

A study was undertaken at a commercial site consisting of a 512 MW boiler equipped with cold-side electrostatic precipitator ("ESP") and a flue gas wet scrubber process comprised of limestone forced oxidation ("LSFO") wet FGD system. The boiler fired high-sulfur sulfur bituminous coal.

Samples of the LSFO wet FGD liquor were collected during the demonstration under the noted conditions and analyzed for total selenium. The results are presented in the table below as well as FIG. 1.

Results of Example 6.

| Condition | Selenium Content (μg/L) | | Percent Removal |
|---|---|---|---|---|
| | Untreated | Treated | Reduction | |
| Baseline | 676 | 617 | 59 | 8.7 |
| Additive applied | 614 ± 2 | 218 ± 1 | 396 | 64.4 |
| Additive applied 2 | 585 | 205 | 380 | 65.0 |
| Additive Off | | 799 | | |
| Additive reapplied | | 318 | | |

The untreated unit was burning the same fuel during this commercial test. Chemistry 1 was applied to the treated unit. Two samples were taken during different periods of the demonstration while the technology was applied. The disclosed technology was turned off for 18 hours (i.e. Condition Additive Off shown above) prior to sampling. Then Chemistry 1 was reapplied to obtain the final condition, i.e. additive reapplied.

As can be seen in the previous table, the untreated unit total selenium varied from 585 to 676 μg/L. The application of the disclosed technology resulted in 65% reduction of selenium in the scrubber liquor. The efficacy of the technology is further demonstrated by the cessation of the application of the technology resulting in an observed increase in total selenium which was again reduced by reapplication of the technology. It is clear from these results that Chemistry 1 reduces selenium concentration in wet FGD liquor.

Chemistry 2

Examples 7-11

Example 7

Methyl Acrylate/Tetraethylenepentamine Polymer Backbone which is then Functionalized with a Dithiocarbamate Group a. Methyl Acrylate/Tetraethylenepentamine Polymer Backbone Synthesis Tetraethylenepentamine (TEPA) (18.275 weight %) was charged into a glass reactor fitted with a mechanical stirrer and a condenser. While purging the headspace with nitrogen and stirring, methyl acrylate (16.636 weight %) was added dropwise over 30 min where the temperature was maintained between 25-31° C. during the addition and for 1 h after the addition was finished. Next, a second charge of TEPA (18.275 weight %) was performed and the resulting reaction mixture was heated to 130° C. This temperature was held for ~3 h while collecting the condensate in a Dean-Stark trap. At this time, the polymer melt was allowed to cool to 120° C. and then slowly diluted with deionized (DI) water (46.814 weight %) keeping the temperature above 90° C. during the dilution. The resulting ~50 weight % polymer solution was then cooled to room temperature. Weight average molecular weight of the polymer was determined to be 7,500 using a size exclusion chromatography method and polysaccharide standards.

b. Dithiocarbamate Polymer Preparation

The second step involved adding the methyl acrylate/TEPA polymer (35.327 weight %), DI Water (28.262 weight %), and Dowfax 2A1 (0.120 weight %), Dow Chemical Company Midland, Mich. 48674, USA, to a round bottom flask fitted with a mechanical stirrer. Next, a 50% NaOH solution (9.556 weight %) was added to the stirring reaction mixture. Once the mixture was heated and maintained at 40° C., carbon disulfide (17.179 weight %) was added drop-wise over 2 h. One hour within the carbon disulfide addition, another amount of 50% NaOH (9.556 weight %) was charged. The reaction mixture was maintained at 40° C. for an additional 2 h. Finally, the reaction was cooled to room temperature and filtered through filter paper to obtain ~40 weight % polymeric dithiocarbamate product.

Example 8

Acrylic Acid/Tetraethylenepentamine Polymer Backbone which is then Functionalized with a Dithiocarbamate Group a. Acrylic Acid/Tetraethylenepentamine Polymer Backbone Synthesis Tetraethylenepentamine (TEPA) (37.556 weight %) and sulfuric acid (0.199 weight %) was charged into a glass reactor fitted with a mechanical stirrer and a condenser. While purging the headspace with nitrogen and stirring, acrylic acid (14.304 weight %) was added dropwise over 30 min where the temperature was maintained between 130-140° C. during the addition, allowing the exotherm from the acid base reaction to reach the desired temperature. Next the resulting reaction mixture was heated to 160° C. This temperature was held for 4.5 h while collecting the condensate in a Dean-Stark trap. At this time, the polymer melt was allowed to cool to 120° C. and then slowly diluted with DI water (47.941 weight %) keeping the temperature above 90° C. during the dilution. The resulting ~50 weight % polymer solution was then cooled to room temperature. Weight average molecular weight of the polymer was determined to be 4,700 using a size exclusion chromatography method and polysaccharide standards.

b. Dithiocarbamate Polymer Preparation

The second step involved adding the acrylic acid/TEPA polymer (31.477 weight %), DI Water (36.825 weight %), and Dowfax 2A1 (0.118 weight %) to a round bottom flask fitted with a mechanical stirrer. Next, a 50% NaOH solution (8.393 weight %) was added to the stirring reaction mixture. Once the mixture was heated and maintained at 40° C., carbon disulfide (14.794 weight %) was added drop-wise over 2 h. One hour within the carbon disulfide addition, another amount of 50% NaOH (8.393 weight %) was charged. The reaction mixture was maintained at 40° C. for an additional 2 h. Finally, the reaction was cooled to room temperature and filtered though filter paper to obtain 35 weight % polymeric dithiocarbamate product.

Example 9 a. Acrylamide/Tetraethylenepentamine Polymer Backbone Synthesis

Tetraethylenepentamine (TEPA) (14.581 weight %) was charged into a glass reactor fitted with a mechanical stirrer and a condenser. While purging the headspace with nitrogen and stirring, a 48.6% acrylamide solution (30.441 weight %) was added dropwise over 1 h during which the desired temperature was reached and was maintained between 65-75° C.

After the acrylamide charge, the temperature was maintained for an additional 1 h. Next, a second charge of TEPA (14.581 weight %) was performed and the resulting reaction mixture was heated to 160° C. while collecting the distilled water via a Dean-Stark trap. This temperature was held for ~4 h while continuing to collect the condensate in a Dean-Stark trap and trapping the released ammonia side product. At this time, the polymer melt was allowed to cool to 120° C. and then slowly diluted with DI water (40.397 weight %) keeping the temperature above 90° C. during the dilution. The resulting ~50 weight % polymer solution was then cooled to room temperature. Weight average molecular weight of the polymer was determined to be 4500 using a size exclusion chromatography method and polysaccharide standards.

b. Dithiocarbamate Polymer Preparation

The second step involved adding the acrylamide/TEPA polymer (34.004 weight %), DI Water (36.518 weight %), and Dowfax 2A1 (0.122 weight %) to a round bottom flask fitted with a mechanical stirrer. Next, a 50% NaOH solution (7.763 weight %) was added to the stirring reaction mixture. Once the mixture was heated and maintained at 40° C., carbon disulfide (13.830 weight %) was added drop-wise over 2 h. One hour within the carbon disulfide addition, another amount of 50% NaOH (7.763 weight %) was charged. The reaction mixture was maintained at 40° C. for an additional 2 h. Finally, the reaction was cooled to room temperature and filtered though filter paper to obtain ~35 weight % polymeric dithiocarbamate product.

Example 10

A sample of scrubber water was treated and then allowed to settle. A supernatant sample was taken and measured for total mercury content and then filtered for dissolved mercury content. The objective was to remove mercury. The samples were investigated for mercury removal relative to the dosage of Chemistry 2 in wet FGD liquors from two different coal-fired power plants.

The results show that a mercury level of less than 0.5 ppb in the treated water was achieved at reasonable product dosages. This work demonstrated that the polymer achieved mercury capture from wet FGD liquors. The lower detection limit of the analytical method was 0.010 ppb. The efficient/effective action of mercury capture by Chemistry 2 can be extrapolated to its ability to successfully prevent mercury re-emission within an operating wet FGD.

| Number | Sample Name | DTCP[a] (ppm) | Flocculant[b] (ppm) | Total Hg content (ppb) | Dissolved Hg content (ppb) |
|---|---|---|---|---|---|
| | Plant 1 | | | | |
| 1 & 2 | Blank as recd (pH = 6.5) | 0 | 0 | 22899 | 1.000 |
| 15 | | 5 | 3 | 0.520 | 0.096 |
| 16 | | 10 | 3 | 0.416 | 0.060 |
| 17 | | 15 | 3 | 0.294 | 0.043 |
| 18 | | 20 | 3 | 0.384 | 0.050 |
| | Plant 2 | | | | |
| 2 | Blank as recd (pH = 5.5) | 0 | 0 | N/A | 83.073 |
| 3 | | 7.5 | 0 | N/A | 0.034 |
| 4 | | 15 | 0 | N/A | 0.031 |
| 5 | | 30 | 0 | N/A | 0.042 |
| 6 | | 60 | 0 | N/A | 0.034 |

[a]DTCP is a polydithiocarbamic polymer of the present invention
[b]Flocculant is commercially available from Nalco Company and is a very high molecular, 65 mole % cationic latex polymer.

Example 11

A sample of scrubber water was treated at temperatures typical of wet FGD operations (50° C.), measured with an ORP electrode and then filtered. The objective was to investigate the effect that Chemistry 2 has on the ORP of the liquor and selenium removal relative to the dosage.

Figure 2:
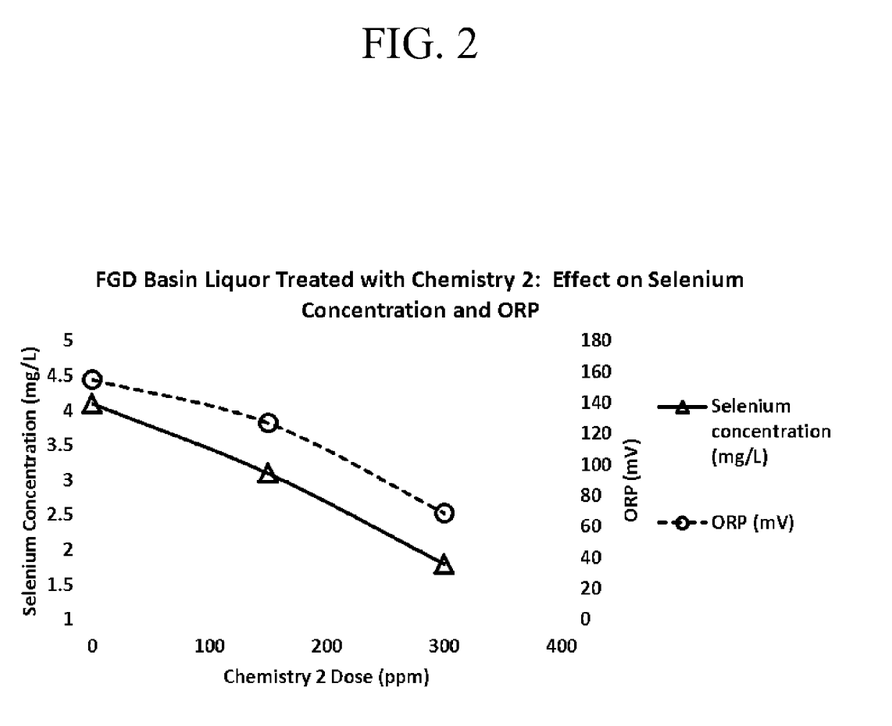
FIG. 2 is a graph demonstrating the positive effects of Chemistry 2 on decreased selenium concentration and decreased oxidation-reduction potential in the aqueous phase of a flue gas wet scrubber process.

The results show that Chemistry 2 is capable of removing selenium from wet FGD liquor. In this case, 56% removal of selenium was achieved. This work also demonstrated that Chemistry 2 can successfully lower the ORP of the liquor, thus reducing the tendency for corrosion within a wet FGD scrubber. Graphical results of these tests is illustrated in FIG. 2.

| Number | Sample Name Plant 3 | DTCP[a] (ppm) | ORP (mV) | Dissolved Se content (ppm) | % Se Removal |
|---|---|---|---|---|---|
| 2 | Blank as recd (pH = 5.5) | 0 | 155 | 4.1 | 0 |
| 6 | | 150 | 127 | 3.1 | 24 |
| 8 | | 300 | 69 | 1.8 | 56 |

[a]DTCP is a polydithiocarbamic polymer of the present invention

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the illustrated specific embodiments or examples is intended or should be inferred. The disclosure is intended to cover by the appended claims all such modifications as fall within the scope of the claims.

We claim:

1. A method for removing selenium from flue gas in a flue gas wet scrubber process, the method comprising:

providing flue gas; and passing the flue gas into the flue gas wet scrubber process comprising a scrubber liquor and a composition comprising a polymer derived from at least two monomers: acrylic-x and an alkylamine, and wherein said acrylic-x has the following formula:

wherein X=OH and salts thereof or NHR² and wherein R¹ and R² is H or an alkyl or aryl group, wherein the molecular weight of said polymer is between 500 to 200,000, and wherein said polymer is modified to contain a functional group capable of scavenging at least one metal-comprising composition.

2. The method of claim 1, wherein the flue gas wet scrubber process further comprises a polydithiocarbamic compound of at least one polythiocarbamic material.

3. The method of claim 1, wherein the flue gas wet scrubber process further comprises a second composition comprising a transition metal salt.

4. The method of claim 1, wherein the flue gas wet scrubber process comprises a wet flue gas desulfurizer process.

5. The method of claim 1, wherein the functional group is a dithiocarbamate salt group and wherein the polymer has between 55 to 80 mole % of said dithiocarbamate salt group.

6. The method of claim 1, wherein the acrylic-x is acrylic acid or salts thereof and the alkylamine is pentaethylenehexamine or tetraethylenepentamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

7. The method of claim 1, wherein the acrylic-x is acrylamide and the alkylamine is pentaethylenehexamine or tetraethylenepentamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

8. The method of claim 1, wherein the flue gas results from a burning of a fuel selected from the group consisting of coal, reclaimed coal, natural gas, industrial waste, a gasified waste product, biomass, and combinations thereof.

9. A method for minimizing corrosion in a flue gas wet scrubber process, the method comprising:
providing flue gas; and
passing the flue gas into the flue gas wet scrubber process comprising a polymer derived from at least two monomers: acrylic-x and an alkylamine, and wherein said acrylic-x has the following formula:

wherein X=OH and salts thereof or NHR² and wherein R¹ and R² is H or an alkyl or aryl group, wherein the molecular weight of said polymer is between 500 to 200,000, and wherein said polymer is modified to contain a functional group capable of scavenging at least one metal-comprising composition.

10. The method of claim 9, wherein the flue gas wet scrubber process further comprises a polydithiocarbamic compound of at least one polythiocarbamic material.

11. The method of claim 9, wherein the flue gas wet scrubber process further comprises a transition metal salt.

12. The method of claim 9, wherein the flue gas wet scrubber process comprises a wet flue gas desulfurizer process.

13. The method of claim 9, wherein the flue gas wet scrubber process employs equipment comprising 2205 alloy.

14. The method of claim 9, wherein the functional group is a dithiocarbamate salt group and wherein the polymer has between 55 to 80 mole % of said dithiocarbamate salt group.

15. The method of claim 9, wherein the acrylic-x is acrylic acid or salts thereof and the alkylamine is pentaethylenehexamine or tetraethylenepentamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

16. The method of claim 9, wherein the acrylic-x is acrylamide and the alkylamine is pentaethylenehexamine or tetraethylenepentamine or diethylenetriamine or triethylenetetraamine or ethylenediamine, and wherein the molar ratio between acrylic-x and alkylamine is from 0.85 to 1.5; and wherein the molecular weight of said polymer is from 1,500 to 8,000; and wherein the polymer is modified to contain more than 55 mole percent dithiocarbamic acid or salts thereof.

17. The method of claim 9, wherein the flue gas results from a burning of a fuel selected from the group consisting of coal, reclaimed coal, natural gas, industrial waste, a gasified waste product, biomass, and combinations thereof.

18. The method of claim 1, wherein the flue gas results from a burning of coal.

19. The method of claim 9, wherein the flue gas results from a burning of coal.

20. A method for removing selenium from scrubber liquor, the method comprising:
providing scrubber liquor containing a concentration of selenium; and
treating the scrubber liquor with an amount of a polymer derived from at least two monomers:
acrylic-x and an alkylamine, and wherein said acrylic-x has the following formula:

wherein X=OH and salts thereof or NHR² and wherein R¹ and R² is H or an alkyl or aryl group, wherein the molecular weight of said polymer is between 500 to 200,000, and wherein said polymer is modified to contain a functional group capable of scavenging at least one metal-comprising composition; and
wherein the amount reduces the concentration of the selenium in the scrubber liquor from about 20 to about 60%.

* * * * *